(12) United States Patent
Trantham

(10) Patent No.: US 11,455,402 B2
(45) Date of Patent: Sep. 27, 2022

(54) NON-VOLATILE MEMORY WITH PRECISE WRITE-ONCE PROTECTION

(71) Applicant: Seagate Technology LLC, Cupertino, CA (US)

(72) Inventor: Jon D. Trantham, Chanhassen, MN (US)

(73) Assignee: Seagate Technology LLC

( * ) Notice: Subject to any disclaimer, the term of this patent is extended or adjusted under 35 U.S.C. 154(b) by 907 days.

(21) Appl. No.: 16/261,960

(22) Filed: Jan. 30, 2019

(65) Prior Publication Data
US 2020/0242257 A1 Jul. 30, 2020

(51) Int. Cl.
*G06F 21/60* (2013.01)
*G06F 3/06* (2006.01)

(52) U.S. Cl.
CPC .......... *G06F 21/602* (2013.01); *G06F 3/064* (2013.01); *G06F 3/0623* (2013.01); *G06F 3/0659* (2013.01); *G06F 3/0679* (2013.01)

(58) Field of Classification Search
CPC ...... G06F 21/602; G06F 3/0623; G06F 3/064; G06F 3/0659; G06F 3/0679
See application file for complete search history.

(56) References Cited

U.S. PATENT DOCUMENTS

| 5,544,119 | A | 8/1996 | Wells et al. |
|---|---|---|---|
| 6,026,017 | A | 2/2000 | Wong et al. |
| 6,185,661 | B1 | 2/2001 | Ofek et al. |
| 6,272,086 | B1 | 8/2001 | Jaquette et al. |
| 6,459,571 | B1 | 10/2002 | Carteau |
| 6,496,366 | B1 | 12/2002 | Coglitore et al. |
| 6,711,659 | B2 * | 3/2004 | Miller ................ G06F 3/0613 710/33 |
| 7,003,621 | B2 | 2/2006 | Koren et al. |
| 7,089,350 | B2 | 8/2006 | Koren et al. |
| 7,305,458 | B2 | 12/2007 | Hsue et al. |
| 7,373,460 | B2 * | 5/2008 | Kobayashi ............ G06F 3/0611 711/137 |
| 7,418,623 | B2 | 8/2008 | Elliott et al. |
| 7,475,203 | B1 | 1/2009 | Petrillo, Jr. et al. |
| 7,536,586 | B2 | 5/2009 | Ahmadian et al. |
| 7,568,122 | B2 | 7/2009 | Mechalke et al. |
| 7,574,554 | B2 | 8/2009 | Tanaka et al. |
| 7,581,118 | B2 | 8/2009 | McGovern |

(Continued)

OTHER PUBLICATIONS

"Method for Secure Data Erasure in DRAM," IP.com, Oct. 2, 2012, p. 3, IP.com Electronic Publiation.

*Primary Examiner* — Hosuk Song
(74) *Attorney, Agent, or Firm* — Hall Estill Law Firm

(57) ABSTRACT

Apparatus and method for selective overwrite protection of data stored in a non-volatile memory (NVM) with fine precision. In some embodiments, a write command is received from a host device to write one or more blocks of data having associated logical addresses to the NVM. A read operation is performed in response to the write command to read a tag value associated with each block. The write command is disallowed in response to the tag value indicating a protected version of the block having the associated logical address is already stored at the selected location. The tag value may be a key version value indicative of a version of an encryption key used to encrypt user data in the data block and whether the block is write-protected.

20 Claims, 6 Drawing Sheets

(56) References Cited

U.S. PATENT DOCUMENTS

| | | |
|---|---|---|
| 7,739,315 B2 | 6/2010 | Haga |
| 7,814,554 B1 | 10/2010 | Ragner |
| 7,877,626 B2 | 1/2011 | Piszcek et al. |
| 7,958,166 B2 | 6/2011 | Hsu |
| 8,010,713 B2 | 6/2011 | Matumura et al. |
| 8,099,605 B1 | 1/2012 | Billsrom et al. |
| 8,275,996 B1 | 9/2012 | Melvin |
| 8,296,406 B2 | 10/2012 | Kasperson et al. |
| 8,478,723 B2 * | 7/2013 | Rousseau .............. G06F 3/064 707/633 |
| 8,499,192 B2 * | 7/2013 | Rousseau ........... G06F 11/1471 714/6.1 |
| 8,874,829 B2 * | 10/2014 | Yamasaki ............. G06F 3/0688 711/103 |
| 8,880,826 B2 * | 11/2014 | Cherian ................. G06F 21/60 711/163 |
| 8,918,554 B2 * | 12/2014 | Lai ........................ G06F 3/0659 710/33 |
| 9,081,671 B2 * | 7/2015 | Rousseau ............. G06F 3/0604 |
| 9,164,704 B2 * | 10/2015 | Marukame ........... G06F 3/0688 |
| 9,396,359 B2 * | 7/2016 | Griffes ................. H04L 9/0822 |
| 9,952,766 B2 * | 4/2018 | Woo ..................... G06F 3/0616 |
| 2003/0065751 A1 | 4/2003 | Autor |
| 2005/0028048 A1 | 2/2005 | New |
| 2005/0231846 A1 | 10/2005 | Winarski et al. |
| 2005/0235095 A1 | 10/2005 | Winarski et al. |
| 2006/0072244 A1 | 4/2006 | Rapp |
| 2006/0080494 A1 | 4/2006 | Kawaguchi et al. |
| 2006/0136752 A1 | 6/2006 | Miller et al. |
| 2007/0230110 A1 | 10/2007 | Starr et al. |
| 2008/0140910 A1 | 6/2008 | Flynn et al. |
| 2009/0196100 A1 | 8/2009 | Merry, Jr. et al. |
| 2009/0231800 A1 | 9/2009 | Franz et al. |
| 2009/0259808 A1 | 10/2009 | Koren et al. |
| 2009/0296475 A1 | 12/2009 | Hemink et al. |
| 2010/0211737 A1 | 8/2010 | Flynn et al. |
| 2010/0262721 A1 | 10/2010 | Asnaashan et al. |
| 2011/0035540 A1 | 2/2011 | Fitzgerald |
| 2011/0055458 A1 | 3/2011 | Kushne |
| 2012/0093318 A1 | 4/2012 | Obuknov et al. |
| 2012/0151121 A1 | 6/2012 | Braga |
| 2012/0278564 A1 | 11/2012 | Goss et al. |
| 2012/0325127 A1 | 12/2012 | Adrain |
| 2013/0060994 A1 | 3/2013 | Higgins |
| 2013/0151769 A1 | 6/2013 | Childs et al. |
| 2013/0219101 A1 | 8/2013 | Hansen et al. |
| 2014/0022849 A1 | 1/2014 | Krutzik et al. |

\* cited by examiner

CRYPTO AUTHENTICATION

SSD ARCHITECTURE

NON-VOLATILE MEMORY WITH PRECISE WRITE-ONCE PROTECTION

SUMMARY

Various embodiments of the present disclosure are generally directed to selective overwrite protection of data stored in a non-volatile memory (NVM), such as a rotatable data recording medium (e.g., magnetic discs) or a semiconductor memory (e.g., flash memory), with fine precision (e.g., by individual logical block).

In some embodiments, a write command is received from a host device to write a block of data having an associated logical address to the NVM. A read operation is performed in response to the write command to read a tag value associated from a selected location of the NVM assigned for storage of the data block. The write command is disallowed in response to the tag value indicating a protected version of the data block having the associated logical address is stored at the selected location. The tag value may be a key version value indicative of a version of an encryption key used to encrypt user data in the data block.

These and other features which may characterize various embodiments can be understood in view of the following detailed discussion and the accompanying drawings.

DETAILED DESCRIPTION

Figure 1:
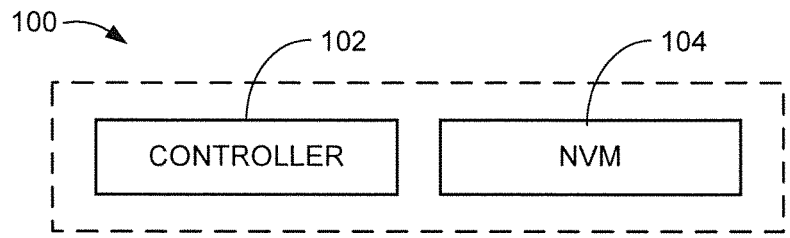
FIG. 1 provides a functional block representation of a data storage device in accordance with various embodiments.

Data storage devices (drives) are used to store and retrieve computerized user data in a fast and efficient manner. Such devices can utilize a number of different types of non-volatile memory (NVM) to store the user data, such as rotatable data recording media (e.g., magnetic discs), solid-state semiconductor memory (e.g., flash), magnetic tape, etc. These and other storage devices typically store blocks of data (e.g., blocks of 512 or 4096 bytes of data are commonly used today) to logical addresses in the NVM. In this disclosure, such blocks will be interchangeably referred to as data blocks or data sectors.

Traditionally, a so-called WORM (write once, read many) drive is a form of data storage device with specifically defined data retention capabilities. A WORM drive employs a write protection scheme to prevent data from being modified, changed, deleted, overwritten, etc. by the host once the data have been written to the drive. This write protection scheme provides an assurance to the user that data cannot be tampered with externally once the data have been written to the device.

WORM protection need not necessarily prevent the storage device itself from rewriting the user data periodically to the storage media, so long as the user data remains unchanged. For example, in an HDD or an SSD, the drive controller may determine that the quality of the stored data has deteriorated due to time or some disturbance, and the drive controller may rewrite or physically relocate the data in order to refresh and preserve the data. In an SSD, it may further be necessary to rewrite the data to a different physical location as part of a garbage collection process such as when non-write-protected logical blocks are stored in the same erasure block as write-protected logical blocks, and the non-write-protected logical blocks are deleted (trimmed) or rewritten. The drive controller may rewrite the write-protected data to a different physical location so long as the contents are preserved in an unaltered state from the user's perspective.

A variety of WORM drive configurations have been proposed in the art. Some configurations provide the write protection at the media level, such as in the case of write-once (WO) recording media that can only be physically written once (e.g., the write protection is permanent). Other forms of WORM drives provide the write protection at the storage device controller level or in host software. In these latter types of schemes, the controller performs a gateway function upon new data blocks that have been presented by a host for writing to the media. The gateway function evaluates data blocks for certain characteristics, such as the logical encryption band of the data blocks' logical block addresses (LBAs), which, if write-protected results in a rejection of the data blocks from being written to the media.

Another challenge with implementing write-once protection in storage drives is the recent addition of secure cryptography to storage devices. It is now common for these drives to support features, such as "Instant Secure Erase" (ISE). Due to the lengthy time of writing the affected data sectors in a hard disk drive, it is highly desirable to not rewrite all the sectors of a drive following an ISE, and it is typically desirable to make all the affected sectors rewritable again following an ISE. A simple scheme of appending a "write-protected" semaphore to each sector could require each sector to have to be rewritten following an ISE, and the time penalty with performing this action is highly undesirable.

Another limitation of device-level protection schemes is with the coarseness of WORM protection. By applying WORM protection across the entire media or an entire encryption band, the user cannot selectively protect individual blocks, files, or directories and must generally choose "all or none" with regards to write protection, including temporary files and directories that the user may wish to frequently overwrite or delete. Selective individual file or directory protection is possible by performing write protection at a higher level, such as in the file-system, however software protection schemes at this level can be more prone to malware, viruses, malevolent employees, etc. than those encapsulated within the storage device.

One aspect of non-permanent device-level write-protection schemes is with who is in control of terminating the write-protection, for example if the device is recycled/repurposed to store different data. From a device owner's perspective, it may be desirable to have different people or systems in control of the device's write-protection features, apart from the user who is storing data on the device. For example, an owner may wish to place drives in a locked room and allow users to remotely store data, but only for other people with physical access to the drive to be able to erase the data written on it.

Various embodiments of the present disclosure are generally directed to an apparatus and method for enacting write protection in a data storage device that overcome these and other limitations with the existing art. As explained below, some embodiments write user data blocks to an NVM with specially configured write protection tag values. The tag values form a portion of the control data (protection information) that is automatically written by a hardware manager circuit during the formatting and scheduling of the data block write operation. These tag values can be written for each data block, allowing fine precision of write protection down to an individual block.

At such time that a write command is received from a host to write one or more selected data blocks each having an associated logical address to the NVM, the device identifies the target locations to which the data is to be written. The device proceeds to read the contents of the target locations in an effort to recover one or more existing tag values. If a tag value is returned from the target locations indicating one or more of the targeted logical blocks is write-protected, the device disallows the writing of the selected data block(s) to the target location. In some cases, the device may return a write protection error to the host to indicate that the write command was rejected.

A number of alternative embodiments are contemplated for the control of the write protection scheme. In some cases, the write protection is permanently enacted, such that a data block (e.g., an LBA) when written with write protection can never be erased from the device. In other cases, drive data can only be overwritten if a user has local direct physical access to the storage device, or to the system incorporating the device; the user communicates to the storage device, such as through the use of an electrical signal through a hardware switch, that overwriting is permissible. In still other cases, the overwriting of data is permitted only after a user successfully performs an authentication operation, such as a cryptographic exchange with the storage device, to prove that the user has authorization to overwrite the previously written data.

The write protection can be applied to the entirety of the storage space of the NVM, or can be selectively enacted so that some LBAs are write protected and other LBAs can be freely overwritten. For example, the host and device can support two sets/types of write commands, one set that indicates to the drive that the LBAs about to be written are permitted to be overwritten on a subsequent write command, and another set of write commands that indicate to the drive that the LBAs to be written are to be write-protected.

It is contemplated that the write protection employed by the various embodiments will apply to rewritable NVM, but the techniques can be applied to erasable NVM as well. As will be recognized by those skilled in the art, rewritable NVM allows a new set of data to be overwritten in place onto an existing set of data during an authorized write operation without the need for an intervening erase (e.g., reset) operation upon the memory. Examples of rewritable NVM including rotatable magnetic recording discs and rewritable semiconductor memory such as spin-torque transfer random access memory (STRAM), phase change random access memory (PCRAM), resistive random access memory (RRAM), etc. These and other forms of rewritable memory often undergo the assignment of selected blocks to physical locations in the media (e.g., physical block addresses or PBAs), so that each time a given LBA is presented for writing it will be written to the same PBA. The various embodiments can also be adapted in cases where the stored blocks of data are of different sizes, such as might be the case when using SMR.

Erasable NVM usually operates to write new version LBAs to a new location (e.g., PBA) within the NVM on the basis that the memory requires an erase operation to reset the memory before the location can accept the new data. Examples of erasable NVM include flash memory and shingled magnetic recording (SMR) tracks on a rotatable magnetic recording disc where a group of LBAs are written as a band of partially overlapping tracks. The various embodiments of the present disclosure can readily be adapted for use in both erasable and rewritable NVM as desired.

These and other features and advantages of various embodiments can be understood beginning with a review of FIG. 1 which shows a simplified functional block representation of a data storage device (drive) 100. The drive 100 includes a top level controller 102 and a non-volatile memory (NVM) module 104. The drive can take any number of suitable forms including a hard disc drive (HDD), a solid-state drive (SDD), a hybrid solid-state drive (HSSD), a tape drive, an optical drive, a portable drive, a thumb drive, an array of storage devices, etc. In each case, the drive generally operates to store data from an upstream device ("host").

Figure 2:
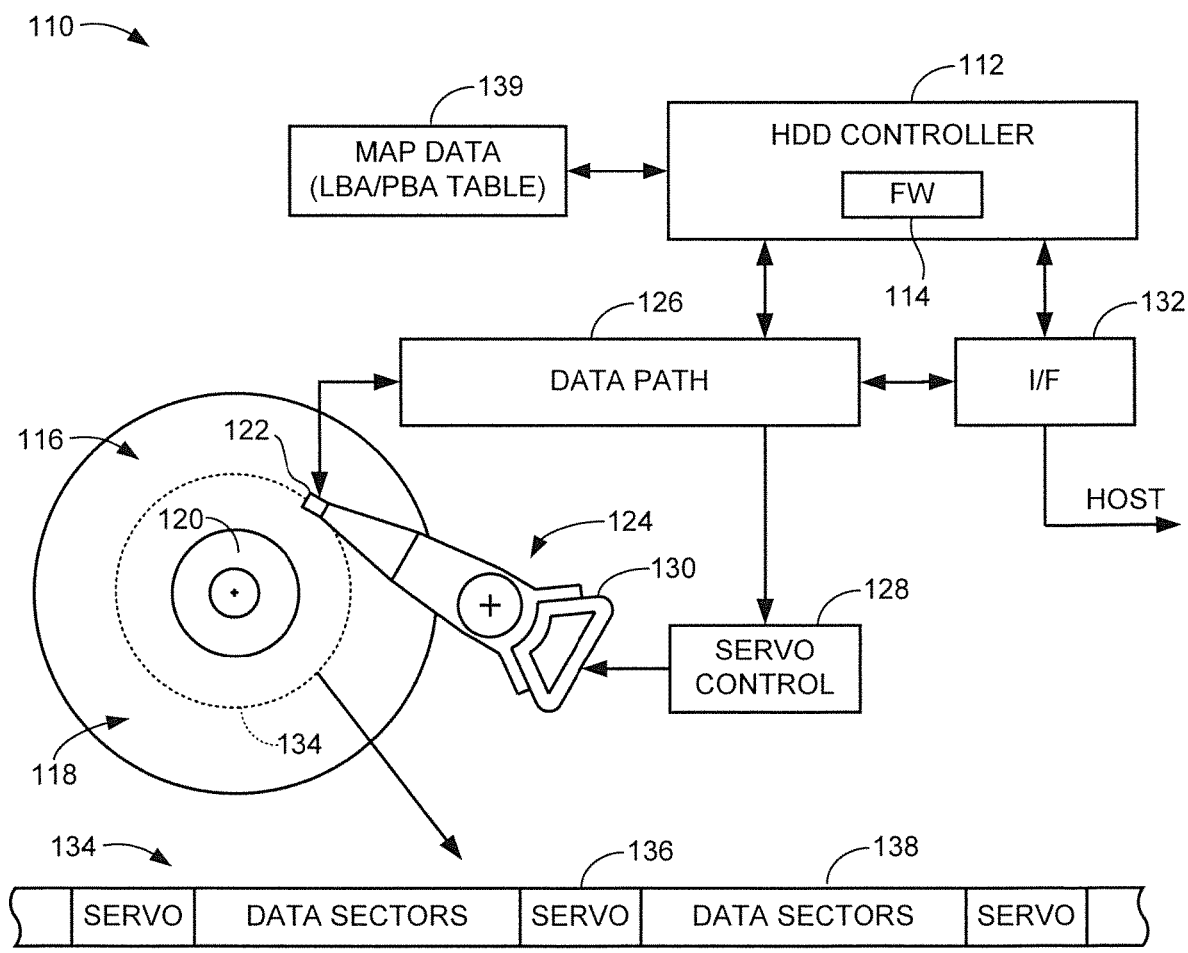
FIG. 2 shows aspects of the device of FIG. 1 characterized as a hard disc drive (HDD) in accordance with some embodiments.

FIG. 2 is a functional block diagram of a drive 110 generally corresponding to the drive 100 in FIG. 1. The drive 110 takes the form of a hard disc drive (HDD), although other forms can be represented by the diagram including a hybrid drive. Top level control of the HDD 110 is provided by an HDD controller 112.

The HDD controller 112 generally corresponds to the controller 102 in FIG. 1 and in this example is realized using one or more programmable processor circuits that execute program instructions in the form of firmware (FW) 114 stored in a local non-volatile memory and loaded to a local volatile memory (e.g., registers, SRAM, DRAM, etc.) during operation. Other forms of controller circuits can be used, including non-programmable hardware based circuits that use Application Specific Integrated Circuits (ASICs), discrete integrated circuits, logic gates, logic arrays and/or other semiconductor structures to carry out various control functions for the drive.

A disc stack 116 generally corresponds to the NVM 104 in FIG. 1 and constitutes one or more rotatable magnetic recording media (discs) 118 mounted to a hub of a spindle motor 120 for rotation at a selected rotational velocity. The discs 118 have recording surfaces accessed by an array of data read/write transducers (heads) 122 that are controllably positioned adjacent the recording surfaces using a rotary actuator 124. The heads are aerodynamically supported (flown) adjacent the recording surfaces by air currents established by the high speed rotation of the discs 118.

A data path 126 constitutes processing circuits that condition the data to be stored to the discs 118 and perform signal processing upon data retrieved from the discs. The data path 126 will be understood to include various elements such as a preamplifier/driver circuit, a write channel circuit, a read channel circuit, a servo demodulation circuit, etc. Portions of the data path 126 may reside within the controller 112.

A servo control circuit 128 receives demodulated servo positioning data from the data path and provides positioning signals in the form of drive currents to a voice coil 130 of a voice coil motor (VCM) coupled to the actuator 124. This provides a closed loop positioning system to advance the heads 122 to various radial locations of the discs 118.

An interface (I/F) circuit 132 communicates commands and data with a host. The I/F circuit 132 may include local buffer memory to provide a write cache to temporarily store user data received from the host for writing to the disc stack 116, a read buffer to temporarily store user data blocks retrieved from the disc stack, etc.

The data blocks received from a host are stored to a number of data tracks defined on each of the recording surfaces. One exemplary track is denoted at 134, and is shown to include a number of spaced apart servo fields 136. The servo fields include the servo positioning information utilized by the servo control circuit 128 during head positioning operations (e.g., track following, seeks to new tracks, etc.).

Data sectors (blocks) 138 are stored along each track in the space between adjacent data sectors. The data sectors 138 include encoded user data as well as other associated data, such as error control coding (ECC) and error detection coding (EDC) information. Each data sector 138 has an associated physical address such as in the form of a physical block address (PBA), which represents the physical address at which the data sector is assigned. PBAs can be expressed in a number of coordinates including disc/head combination, cylinder, track, index (angular) location, etc.

Most data sectors 138 are further assigned a logical address such as in the form of a logical block address (LBA), which represents a logical address assigned to that block for access by the host. In this way, the host can issue data access commands and identify the associated blocks to be transferred (e.g., written, read) using LBA designations. The controller 112 can use map data 139 (such as an LBA to PBA conversion table data structure) to locate the corresponding physical address of the blocks, and then direct one or more write and/or read operations as required to service (or reject) the access command.

Figures 3A, 3B:
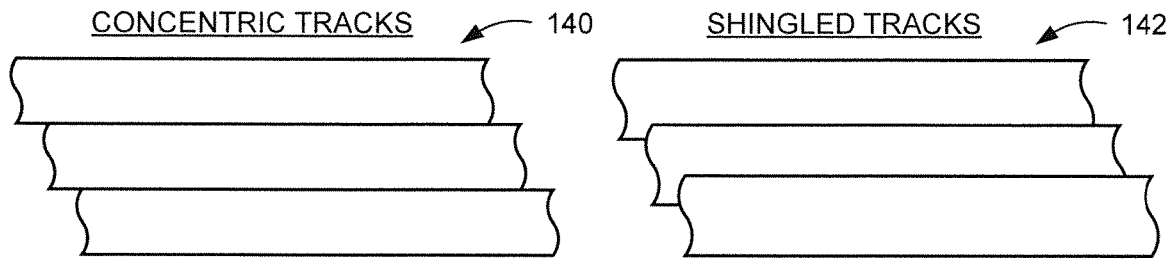
FIGS. 3A and 3B show different configurations of data tracks that can be utilized by the HDD of FIG. 2 in various embodiments.

FIGS. 3A and 3B show different formats for data tracks corresponding to the track 134 in FIG. 2. FIG. 3A shows non-overlapping data tracks 140 which may be arranged as concentric rings or a continuous spiral. FIG. 3B shows shingled tracks 142 where the tracks are written as bands (groups) of partially overlapping tracks using shingled magnetic recording (SMR) techniques where each subsequent track in a band partially overlaps the previous track.

SMR accounts for wider effective widths of the write elements in the heads 122 used to write the magnetic patterns to the discs as compared to the narrower effective widths of the read elements in the heads used to subsequently read (transduce) the magnetic patterns. By subsequently trimming the previously written tracks, greater data storage densities can be achieved albeit at a higher processing cost;

It will be appreciated that the PBAs of the sectors in FIG. 3A can be preassigned so that a given location can be used to write each version of a given LBA. Writing shingled tracks as in FIG. 3B generally requires PBA assignments to take place on-the-fly as new blocks are provided to the system. In this manner, the tracks 140 may represent rewritable NVM and the tracks 142 represent erasable NVM.

Figure 4A:
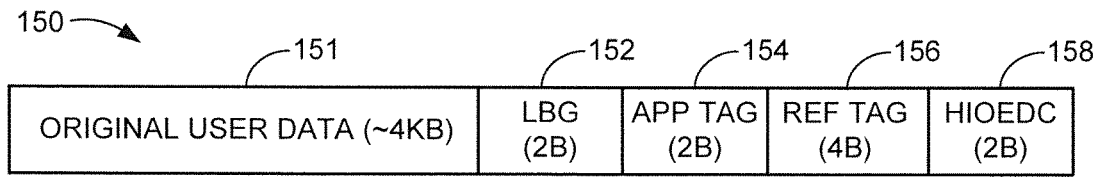
FIG. 4A shows an exemplary data sector format for data received from a host device.
Figure 4B:
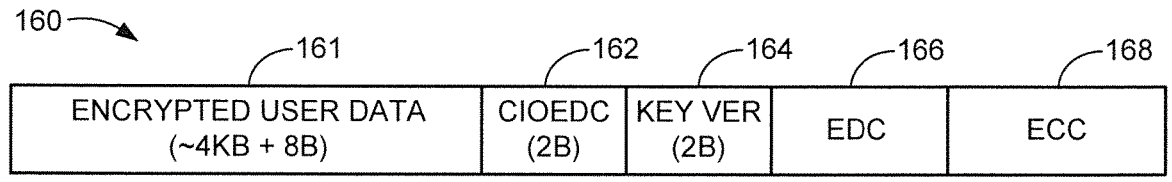
FIG. 4B shows a corresponding exemplary data sector format for data processed by the data path of FIG. 2.

FIGS. 4A and 4B show formats for data sectors processed by the HDD 110 in some embodiments. Without limitation, the data sectors may conform to certain industry interface protocol standards including Serial Attached SCSI (SAS) which allows data sectors to include user data portions and protection information. The protection information is generally used by both the host and the drive to track the data through the system. It will be appreciated that FIGS. 4A and 4B are merely exemplary so that other formats may be used as desired.

Data sector 150 in FIG. 4A generally depicts the format of data supplied by the host. The sector 150 includes a user data field 151 with a fixed amount of user data, such as nominally 4096 bytes, B (~4 KB). The sector 150 further includes protection information in the form of a logical block guard (LBG) in field 152 (2B), an application tag in field 154 (2B), a reference tag in field 156 (4B), and a Host Input-Output Error Detection Code (HIOEDC) in field 158 (2B) is calculated and appended to the data by interface logic 132 of FIG. 2. The LBG is a host-calculated error detecting code over the user data in field 151. The application and reference tags can be varied as desired and may be selected to correspond to particular LBAs or data streams. The HIOEDC value may include the LBA for the sector, alone or in combination with additional processing to ensure the data does not become scrambled or altered internally within the storage device.

Data sector 160 in FIG. 4B shows the format of the data sector 150 after processing by the data path 152 as explained below in FIG. 5. The data sector 160 includes encrypted user data in field 161. The HIOEDC value may be stripped prior to encryption and new protection information values calculated by the device including a Chip Input-Output Error Detection Code (CIOEDC) in field 162, a key version in field 164, error detection codes (EDC) in field 166 and error correction codes (ECC) in field 168. The overall total number of bytes in the processed data sector 160 may be larger than those in the original data sector 150.

Figure 5:
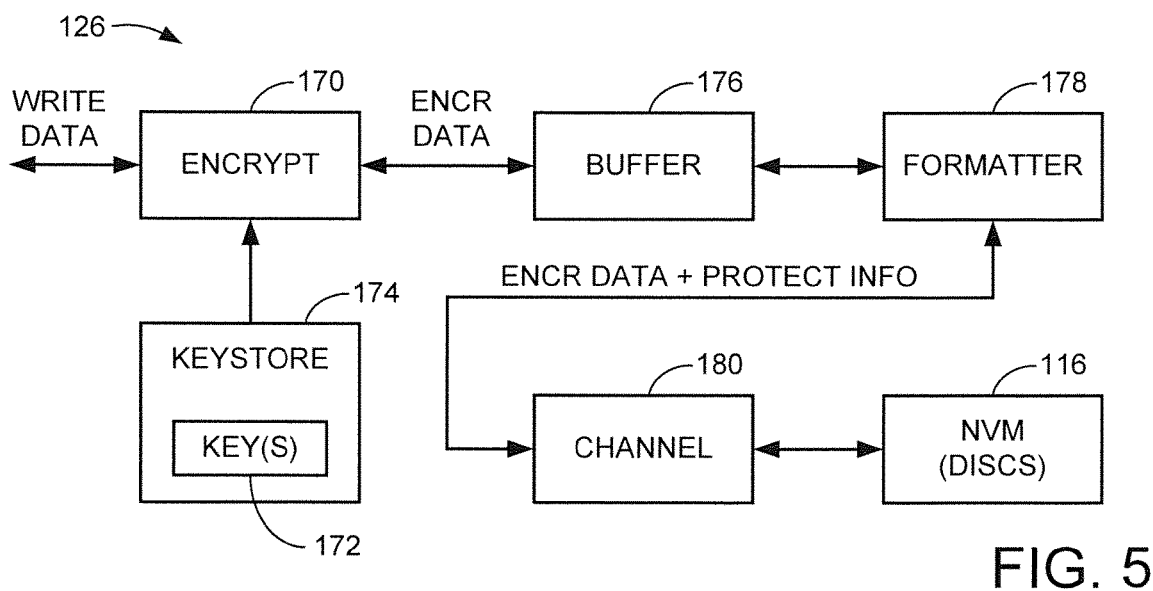
FIG. 5 is a functional block representation of a portion of the data path of the HDD of FIG. 2 in some embodiments.

FIG. 5 shows aspects of the data path 126 from FIG. 2 to illustrate the processing of the data sectors 150, 160. The various elements in FIG. 5 can be realized in programming and/or hardware processing circuits. An encryption circuit 170 encrypts the original user data (field 151) using one or more encryption keys 172 stored in a keystore 174. The encrypted data may include some of the original protection information (e.g., LBG 152, app tag 164 and ref tag 156) supplied or generated prior to the encryption event.

The encrypted data are temporarily stored in a buffer memory 176 pending processing by a formatter circuit 178. The formatter circuit is a hardware manager circuit that generates and appends the various protection information shown in FIG. 4B to form the encrypted data sector 160. The sector 160 is thereafter scheduled for writing and processed by a channel circuit 180 prior to writing to the non-volatile memory (NVM), which in this example is the disc stack 116.

Referring again to FIG. 4B, the key version value in field 164, also sometimes referred to as a tag value, corresponds to the encryption key(s) supplied to encrypt the data. The tag value is also utilized by the HDD 110 to enact write protection for the media 116.

Figure 6:
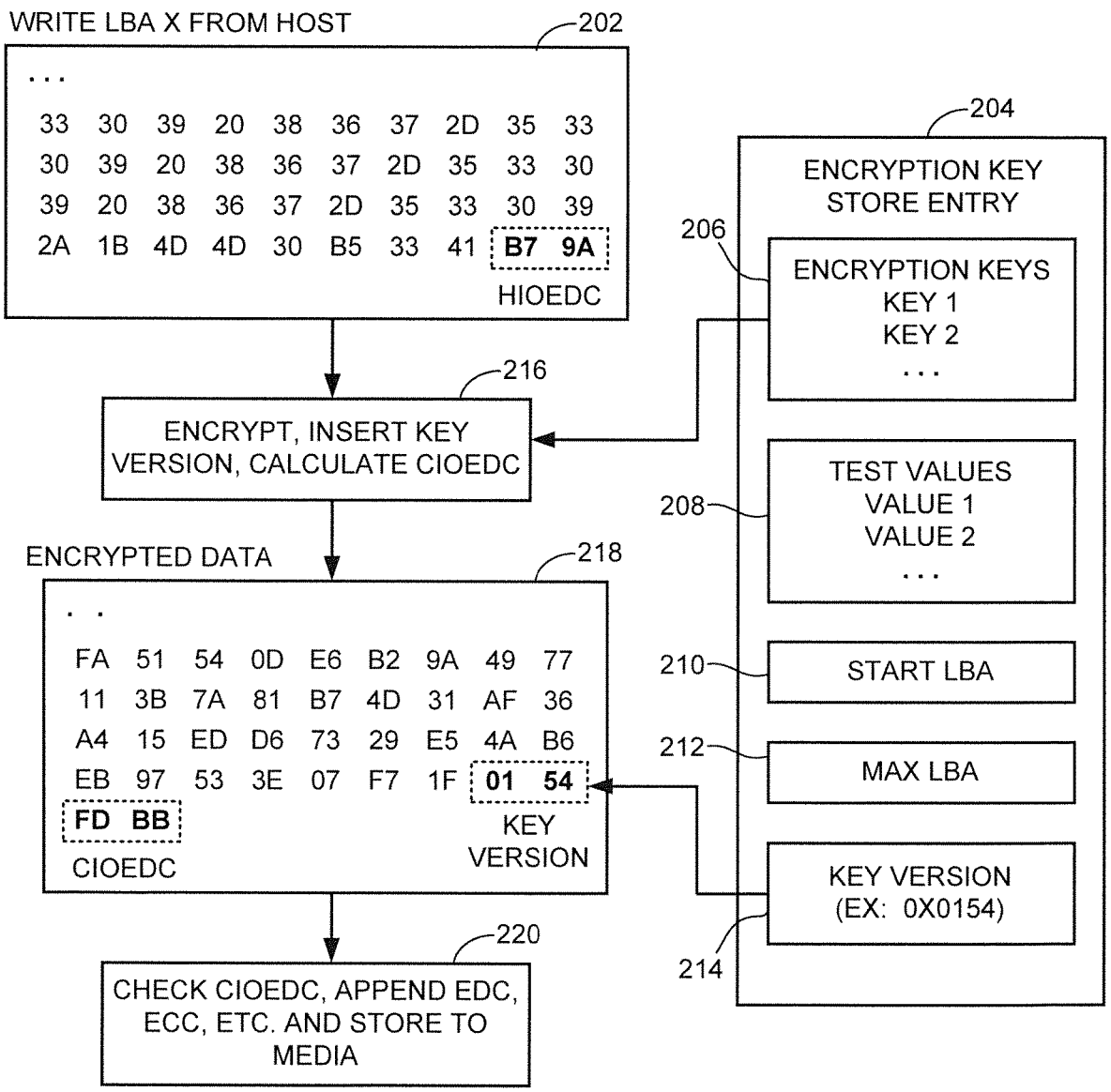
FIG. 6 is a sequence diagram illustrating operations carried out by the circuitry of FIG. 5 in some embodiments.

FIG. 6 is a sequence diagram 200 to provide a concrete illustration of the processing carried out by the circuitry of FIG. 5. Block 202 represents a portion of the write data (field 151) supplied by the host. Appended to the end of this data is the HIOEDC data (field 152). The illustrated data are just exemplary. The HIOEDC is represented by the example value xB79A.

The keystore 174 from FIG. 5 is represented at block 204 and includes various forms of information for each processed entry, range or band of storage assigned to a user. This information includes various encryption keys (block 206), test values (block 208), a starting LBA (block 210), an ending LBA (block 212) and two key version values (block 214). The key version values (in this case, exemplified by the value x0154) corresponds to the version of the encryption key used from block 206. One key version value indicates the written data is write-protected, and the other key version value indicates the written data is not write-protected. The controller selects between the two key version values depending upon whether the host has requested to write-protect the data being written.

Processing block 216 depicts the encryption of the data from block 202, the insertion of the key version, and the calculation of the CIOEDC, which may be calculated xFDBB. These operations of block 216 may be carried out by the formatter 178 of FIG. 5. This provides encrypted data set at block 218.

Processing block 220 next shows further operation by the formatter to verify the calculated CIOEDC value, append the EDC and ECC values, as well as any other desired values, after which the completed sector (such as the sector 160 in FIG. 4B) is stored to the NVM. It will be noted that the various protection information values in the encrypted data sector 160 are generated internally by the data path circuitry and cannot be changed by the controller circuit (e.g., 112, FIG. 2).

Figure 7:
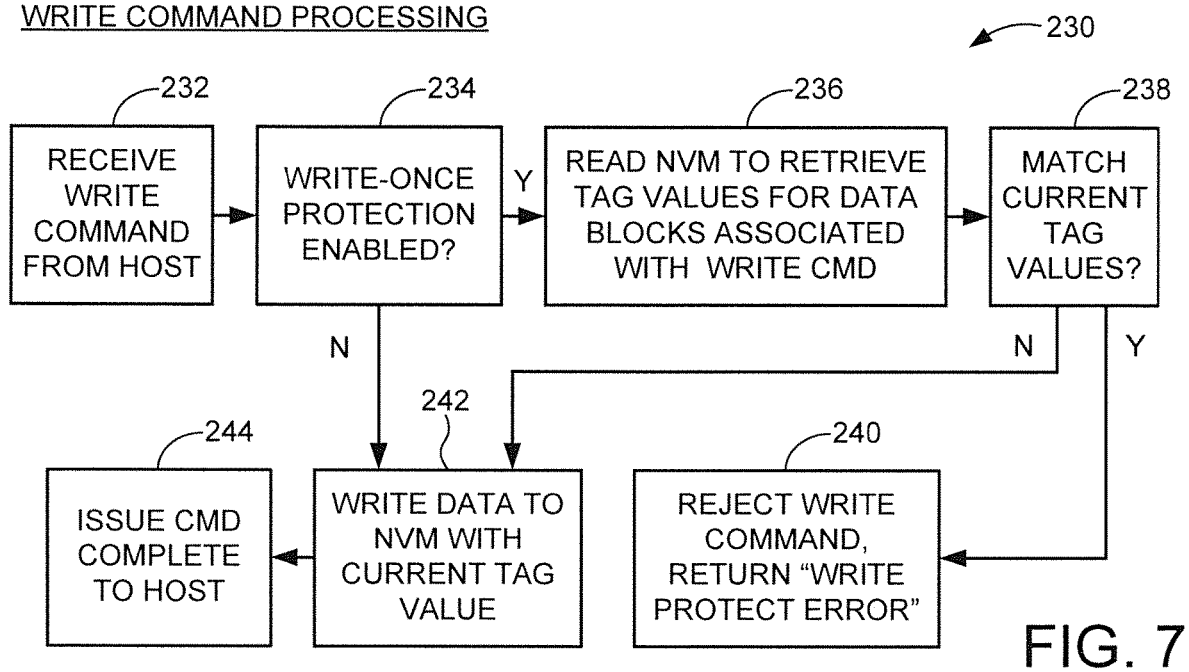
FIG. 7 is a sequence diagram illustrating write command processing by the HDD in some embodiments.

FIG. 7 shows a sequence diagram 230 to illustrate the manner in which write commands are processed by the HDD 110 in accordance with some embodiments. Block 232 shows the initial receipt of a write command from a selected host device. The write command will take a format based on the communication protocol, but may include a write command, an indication of whether the host wishes to write-protect the data, an identification of the LBA(s) of the block(s) to be written, along with the data of each block, which may be in the general format as shown in FIG. 4A (original data sector 150).

Block 234 determines whether write-once protection has been enabled for the HDD 110. If so, the flow passes to block 236 where a read operation is carried out to read the location assigned to the storage of a write-protected copy (if any) of each LBA associated with the write command. The read operation will include an operation to return the tag value (e.g., the key version values) from the media. A predetermined key version value, such as all zeroes, may be supplied for unwritten sectors. This can be useful, for example, during host confirmation of a secure erasure of the media. Secure erasure can be carried out in a variety of ways. A particularly effective way to perform a secure erase of a band of data is to destroy the associated encryption key (see e.g., store 206, FIG. 6) so that the data cannot be decrypted and recovered and new encryption keys are generated (e.g., by a random number generator). The key version values (store 214) are incremented (e.g., by 2) so that data encrypted with the use of a new encryption key will correspondingly use a new key version value.

It follows that if the tag values that are returned from the media match the current write-protected key version tag, then the data blocks have already been written to the media using the current encryption keys. This means that there is previously written valid data in the memory location, and the write command will be rejected, as shown at block 240. In some cases, a write protection error message may be forwarded by the device back to the host to display this status to the user.

On the other hand, if the tag values that are returned do not match the current write protected key version tag values (store 214), then the blocks on the media either contain writable or erased data and it is acceptable to proceed with performing the write operation, as shown by block 242. A write command complete status may be supplied to the host, block 244, to signify that the data have been successfully written. It will be appreciated that subsequent attempts to write updated data to this same location (if the data was written with write-protection) will be denied on the basis that the current key value will not be stored in that location.

Using tag values that are based on the key version data as indications of the presence of existing data that should not be overwritten provides an advantage that data cannot be overwritten so long as the current encryption key remains valid. In this way, write protection can be implemented only so long as a current encryption session has remained valid. Provided that secure erasures cannot be carried out to destroy encryption keys for valid data by unauthorized users, existing data will not be overwritten. Methods for ensuring only authorized entities can carry out secure erasures will be discussed below. However, it will be appreciated that using an encryption key version value as described in FIG. 7 is merely exemplary and is not necessarily limiting. Other forms of tag values can be generated and written to the media by non-controller hardware (e.g., formatter, etc.), including tag values that are not necessarily associated with a given encryption key. In this way, the presence of, or particular value of, the tag value can be used to determine whether data have been written to that location, and the processing of FIG. 7 can be carried out in similar fashion to permit or disallow write operations.

Figure 8:
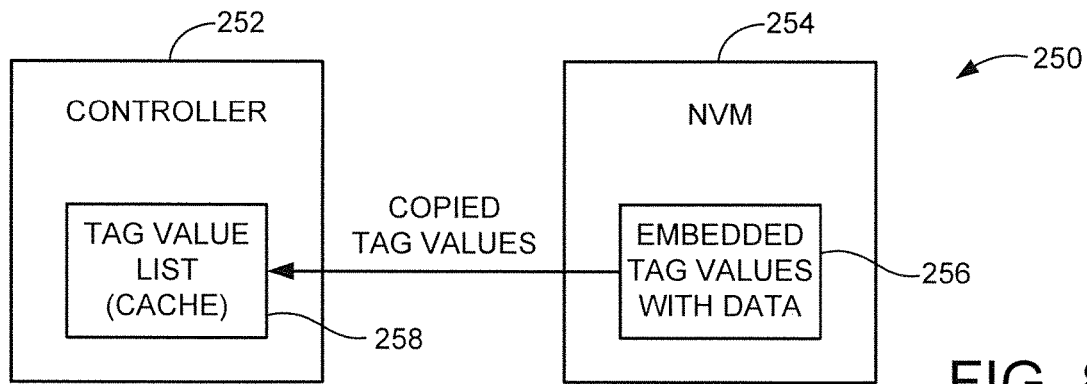
FIG. 8 shows further aspects of the HDD in some embodiments in which a tag value list is maintained in a local cache memory.
Figure 9:
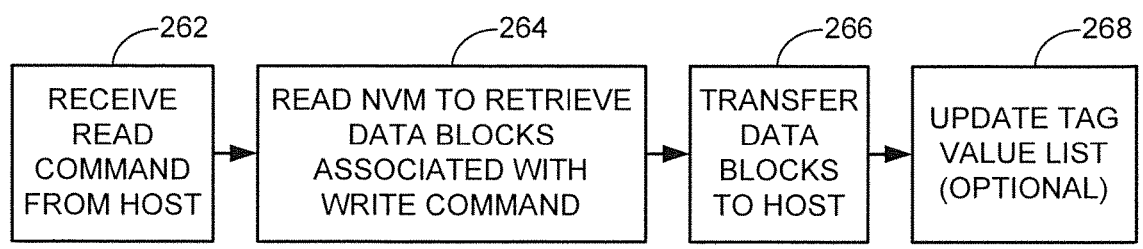
FIG. 9 is a sequence diagram illustrating read command processing by the HDD in some embodiments.

In some cases, it may be helpful for the system to maintain a listing of the tag values that have been written to various locations in the memory. FIG. 8 shows another data storage device 250 similar to the device 110 in FIG. 2. A device controller 252 communicates data and commands to an NVM 254, which stores the embedded tag values along with user data as described above. Tag values accessed from various storage locations 256 in the NVM 254 may be accumulated in a tag value list 258 arranged as a local data structure in local controller memory. Nevertheless, processing during writes will still rely upon accessing the tag values from the NVM FIG. 9 shows a sequence diagram 260 to generally set forth read command processing in accordance with various embodiments. A read command is received from the host, as depicted at block 262. Depending on interface format, the read command may include a listing of a set of LBAs to be retrieved from the NVM.

Block 264 shows processing of the command by the data path 126 (FIG. 2) to retrieve the data blocks associated with the write command. This will include retrieval of the protection information identified above, including the tag version values. Various normal data checks will take place using the protection information, and if successful, the requested data will be returned to the requesting host, block 266. An option that may be included in these data checks are a comparison of the key version tag to the current versions of the tag. If the key versions are old (indicating the drive has been erased), the controller may replace the user data and return a default data pattern, such as an all-zero data pattern to the host. As desired, the tag value list 258 (FIG. 8) may be updated at this time to support further continuity checks with the data stream.

Figure 10:
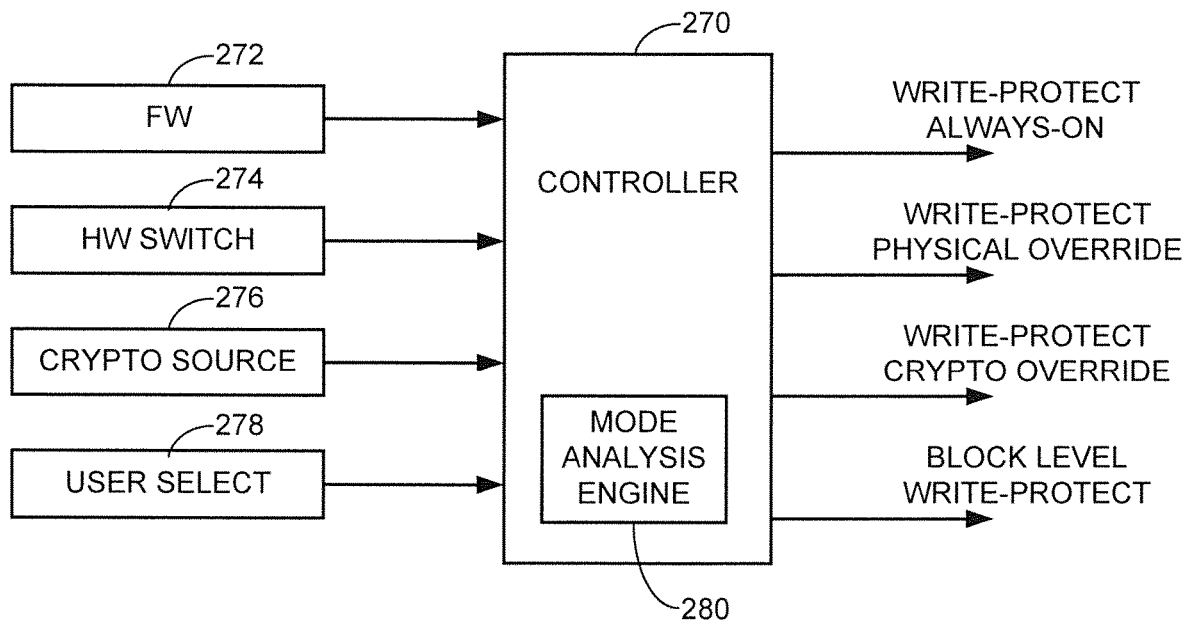
FIG. 10 shows the controller circuit of another storage device configured to enact and disable write protection in different selectable modes.

The present discussion will now turn to various ways in which the write protection scheme disclosed herein can be enacted. Different modes are contemplated. FIG. 10 shows a controller 270 generally corresponding to the storage device controllers discussed above. The controller 270 is configured to receive various inputs from a number of sources. These can include firmware (FW) 272, one or more hardware switches 274, one or more cryptographic function (crypto) sources 276, and one or more user selectable inputs 278. These and other types of inputs can be used as desired, so FIG. 10 is merely illustrative and not limiting.

Various modes of write protection operation are contemplated. In some cases, the controller 270 can be configured to implement different ones of these modes using a mode analysis engine 280, which may be in the form of hardware/firmware associated with the controller 270. In other cases, the storage device may be configured to only operate in a single write protection mode.

A first mode illustrated in FIG. 10 is referred to as Write-Protect Always On. In this mode, the write protection scheme is automatically implemented and cannot be turned off by the user. Based on the foregoing discussion, it will be appreciated that there are two possible always-on modes.

A first always on mode only permits each location in the NVM to be written once, so that the presence of a tag value prevents the subsequent overwriting of data under any circumstances. This can be helpful for archival and data collection environments; for example, a particular video stream from a camera may be captured and the system is configured to not allow the device to alter or change the video/audio frames recorded during an interval. A second always-on mode may remain in force until an authorized secure erasure is carried out, such as by the deletion of one or more encryption keys. This version is thus resettable, allowing the storage device to store new write protected data once a new set of encryption keys has been implemented.

A second write protection mode is referred to as Write-Protect Physical Override mode. In this mode, write protection remains in place as described above until such time that the authorized user can establish physical custody and proximity to the storage device (or associated system components). This can be carried out using one or more of the aforementioned hardware switches 274.

Figure 11:
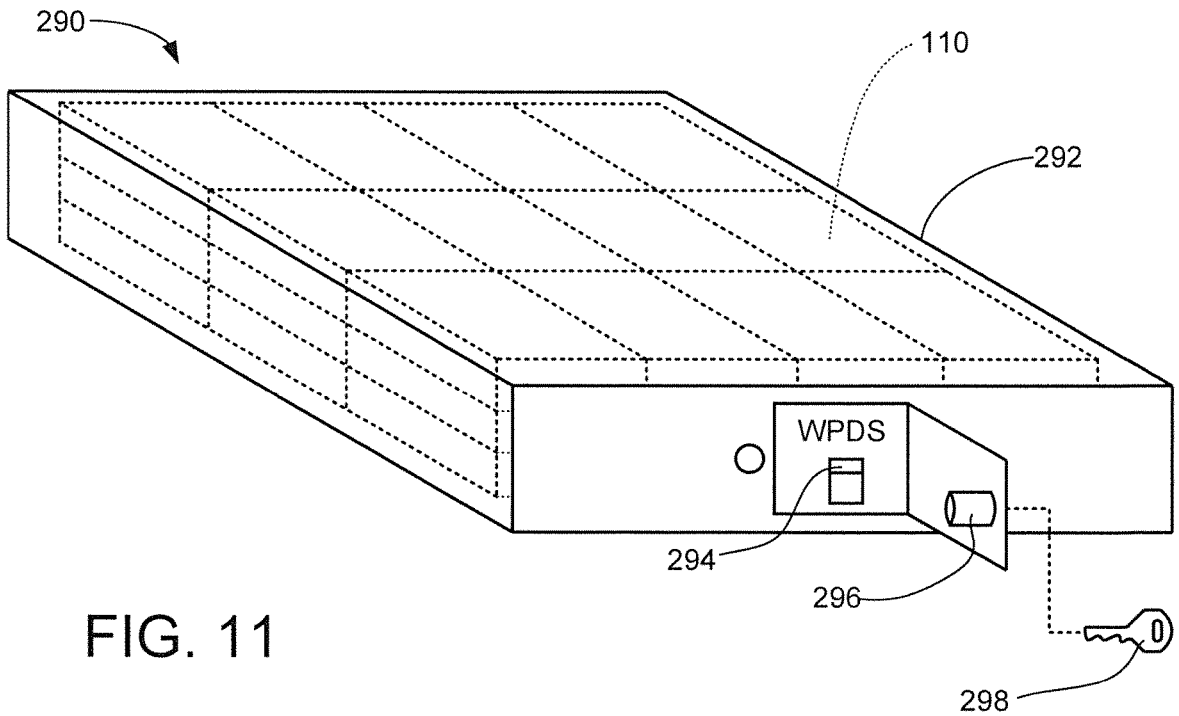
FIG. 11 schematically depicts a multi-device storage enclosure which uses a hardware switch to enable a change in write protection mode for storage devices therein.

FIG. 11 shows a multi-device storage enclosure 290 that can incorporate an override switch to permit the overwriting of data. The enclosure 290 includes a housing 292 in which are arranged a number of data storage devices, such as the HDDs 110 from FIG. 2. In this particular example, a total of 36 (4×3×3) devices are incorporated into the enclosure. Additional components (e.g., controller boards, fans, power supplies, etc.) may be incorporated as well but are omitted for clarity.

A write-protect disable switch (WPDS) 294 is supplied to a rear facing portion of the housing 292. The switch may be protected by a locking door 296 and key 298 arrangement. By unlocking the door and toggling the switch from a first position to a second position, an electrical signal can be forwarded to each of the storage devices 110 to signify that write protection has been disabled. It is contemplated that the interconnections between the switch 294 and the drives 110 are such that the disable signal can only reasonably be generated and received if the user has gained physical access to the enclosure 290.

It will be appreciated that the toggling of the switch can result in a secure erasure of all of the media in the drives, thereby resetting the write protection scheme in the manner discussed above in FIG. 7. Alternatively, the electrical signal can allow a transfer/overwriting of data during such time that the switch remains activated. Other arrangements involving hardware switches can be used.

Figure 12:
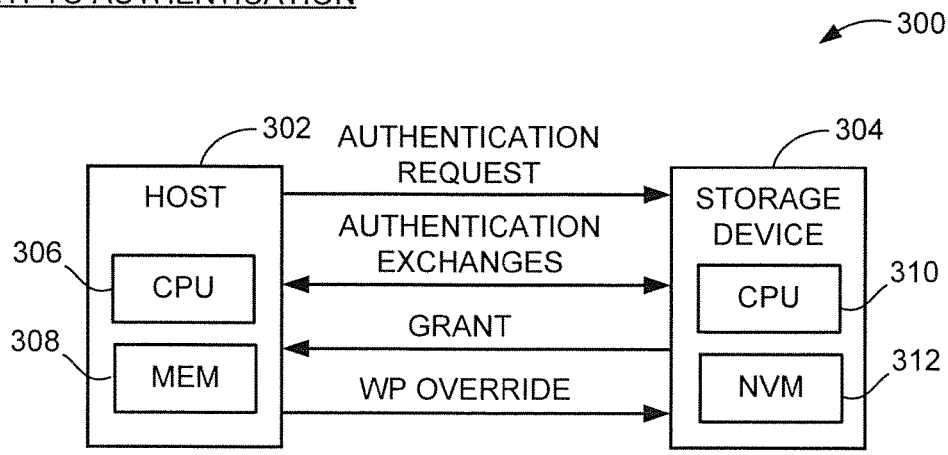
FIG. 12 is a functional block representation of a host device establishing cryptographic authentication to enable a change in write protection mode for a selected storage device.

FIG. 12 shows a data handling system 300 in accordance with further embodiments. The system 300 includes a host device 302 in communication with a storage device 304. These respective elements can take the various forms discussed above. The host includes a programmable processor circuit (CPU) 306 and local memory (MEM) 308. The storage device similarly includes a controller circuit (CPU) 310 and storage memory (NVM) 312. The CPU 310 can be a secure core, e.g., one that is robust against hacking, and likewise the NVM, or at least sensitive portions of the NVM, such as validation keys, may be internal to the controller to be more secure against hacking.

FIG. 12 shows a crypto-based authentication exchange between the host 302 and the storage device 304. Cryptographically secure authentication protocols, such as Extensible Authentication Protocol (EAP), Password Authentication Protocol (PAP), or Challenge-handshake Authentication Protocol (CHAP) may be used for authentication. Authentication steps can include an authentication request forwarded by the host to the storage device; various authentication exchanges including but not limited to the issuance of challenge values or other information; a grant of privileges by the storage device to the host; and a write protection override communication back to the storage device.

The authentication exchanges serve to establish a suitable trust boundary between the host and the storage device. Once this trust boundary has been established, the host can communicate various system changes to the host, including a change in write-protect mode. While the foregoing discussion has contemplated mechanisms to turn off the write protection modes, it will be appreciated that these and other approaches can also be used to authorize the activation (turning on) of the write protection scheme. The key version tags will be written regardless in systems that use the scheme of FIG. 7; it is the activation of checking the values of the returned tags that is turned on and off, respectively.

Figure 13:
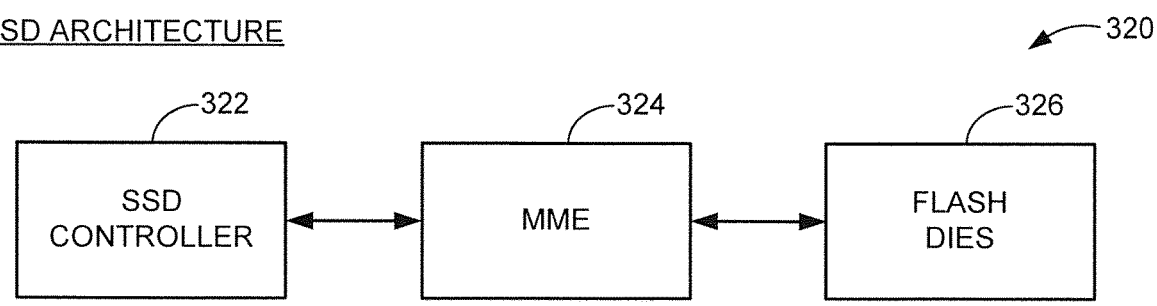
FIG. 13 shows aspects of the device of FIG. 1 characterized as a solid state drive (SSD) in accordance with some embodiments.

Finally, it will be noted that the various write protect modes can be limited to specific ranges or portions of the NVM, to various ranges of LBAs, LUNs, etc. For example, a particular storage device may be configured in accordance with the so-called NVMe (Non-Volatile Memory Express) standard, wherein portions of the NVM are allocated to different users as separate namespaces. Different types of write protection can thus be applied to these and other portions of the available memory in a given device. Various embodiments discussed thus far have largely contemplated the provision of write protection for a storage device with rotatable recording media. As noted in FIGS. 3A and 3B, rotatable media can be arranged to be either rewritable or erasable. FIG. 13 shows a block diagram for a solid state drive (SSD) 320 that can also implement the various write-protect modes discussed above.

The SSD 320 generally includes an SSD controller circuit 322, a memory module electronics (MME) circuit 324, and solid-state non-volatile memory (NVM), such as a number of NAND flash dies 326 that make up a flash memory main store of data. As will be appreciated, flash memory uses flash memory cells that generally require an erasure operation before new data can be overwritten to the cells. The smallest groupings of the flash memory cells that can be erased at a time are referred to as erasure blocks. It is common to group multiple erasure blocks into larger garbage collection units (GCUs) that can be allocated and erased as a unit.

Garbage collection describes the process whereby a given GCU is reset (erased). Because flash memory is erasable, each new version of a given LBA is written to a new location, and each previous version is marked as stale. As the data ages in a typical GCU, the total amount of data stored therein will become increasingly stale. At such point that the GCU is garbage collected, the current data blocks are identified and relocated to a new location (e.g., a new GCU), and then all of the cells in the GCU are erased.

To keep track of where the particular data of a logical block (or groups of logical blocks) are currently physically stored, as well as other operational information such as which flash blocks are free, SSDs typically use tables of metadata. This metadata is often kept apart from user data, and may be cached or stored in different types of non-volatile memory (e.g. power-loss-protected DRAM, STRAM), or in non-volatile memory operating in different modes (e.g. MLC NAND memory in SLC mode). Portions of metadata may also be comingled with user data in main store. Metadata is managed by SSD controller 322.

Write protection can be implemented for a flash memory such as 326 with the addition of the key version tag as described earlier to the metadata tables. Although the write-protect indication can be stored as a single bit of metadata, there are some advantages to storing it as a key version tag. One advantage is that the metadata tables do not have to be erased immediately upon an Instant Secure Erase (ISE). This reduces NAND wear and improves the command response time of an ISE. The current key versions can be updated, and the controller does not have to immediately erase or change any metadata.

The method for using key version tags is the same as is shown in FIG. 7, with two main differences. In step 236, the tag values are read from wherever the block's associated metadata is stored (not the user data itself). Likewise, in step 242 the tag value is stored along with metadata, not with the user data. Other than these two changes the general methodology remains the same for SSD as HDD (and hybrid drives that use both rotatable and solid state NVM).

It will now be appreciated that the various embodiments provide a number of benefits over the existing art. Using tag values written by the data path as part of protection information utilized by the system ensures that existing data will not be overwritten. The various modes provide flexibility to the user to enact different levels and forms of write protection on different data sets, memory locations, etc. Finally, the use of tag values as describes herein advantageously allows the write protection to be lifted as a result of a secure erase of the associated band of data.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
receiving a write command to write one or more blocks of data having associated logical addresses of a non-volatile memory (NVM);
reading at least one tag value from the NVM associated with the blocks targeted by the write command;
disallowing the write command responsive to the at least one tag value being of a first type of tag value associated with a first type of write command indicating a protected block is currently stored at the associated logical address; and
allowing the write command responsive to the at least one tag value being of a different, second type of tag value associated with a different, second type of write command indicating a protected block is not currently stored at the associated logical address.

2. The method of claim 1, wherein the at least one tag value is written to the NVM in a data sector that includes the blocks with which the at least one tag value corresponds.

3. The method of claim 1, further comprising using a selected encryption key to encrypt user data of the blocks prior to writing the blocks to selected locations in the NVM, appending at least one new tag value corresponding to the respective first or second types of tag value to the blocks responsive to the type of the received write command, and writing the blocks and at least one new tag value together to the NVM.

4. The method of claim 3, further comprising associating a metadata tag value to the blocks, and storing the metadata tag values in the NVM apart from the blocks.

5. The method of claim 3, wherein the at least one new tag value is appended to the blocks by a formatter circuit that generates and applies protection information to contents of the blocks.

6. The method of claim 1, further comprising performing a secure erasure of a group of data sectors stored in the NVM by destroying an encryption key in a keystore which was used to encode user data in the group of data sectors, and changing one or more of the at least one tag value stored in the NVM comprising a version value indicative of a version of the encryption key.

7. The method of claim 6, further comprising subsequently writing new data over the group of data sectors responsive to the destruction of the encryption key.

8. The method of claim 1, further comprising writing the blocks to the NVM irrespective of whether the retrieved at least one tag value indicates the blocks are write-protected responsive to a write-protect override signal generated by at least a selected one of a hardware switch or a cryptographic source.

9. The method of claim 1, wherein the NVM comprises at least a selected one of a rotatable magnetic recording disc or a flash memory.

10. An apparatus comprising:
a non-volatile memory (NVM); and
a controller circuit configured to process a write command received from a host device to write one or more blocks of data with associated logical addresses to the NVM by directing a read operation to retrieve, from the NVM, a tag value associated with the logical addresses, and to prevent or allow the writing of the one or more blocks of data to the NVM responsive to the tag value indicating a write-protected previous version of the one or more blocks of data having the logical addresses is currently stored to the NVM, the controller circuit disallowing the write command responsive to the tag value retrieved from the NVM matching a current tag value stored in a keystore indicating write-protection, the controller circuit directing the write command responsive to the tag value retrieved from the NVM not matching the current tag value stored in the keystore.

11. The apparatus of claim 10, wherein the controller circuit is further configured to, in response to an attempt to write a write-protected block, issue a notification to the host device indicating that the write command is rejected on the basis that the one or more blocks of data are write protected and cannot be updated.

12. The apparatus of claim 10, further comprising a data path circuit coupled to the controller circuit, the data path circuit comprising an encryption circuit that encrypts a user data portion of the one or more blocks of data using an encryption key and a formatter circuit which appends a new tag value to the encrypted user data portion of the one or more blocks of data.

13. The apparatus of claim 12, wherein the controller circuit generates the new tag value by applying a cryptographic function to the encryption key and stores the encryption key and the tag value in the keystore accessible by the encryption circuit and the formatter circuit.

14. The apparatus of claim 10, wherein the NVM is characterized as a rewritable memory so that data sectors having selected logical addresses are pre-assigned corresponding physical addresses in the NVM so that each latter version of a given data sector having a given logical address is assigned to the same physical address.

15. The apparatus of claim 10, wherein the NVM is characterized as an erasable memory so that different versions of a selected data sector with a corresponding logical address are nominally stored in different locations within the NVM.

16. The apparatus of claim 10, further comprising a mechanical hardware switch coupled to the controller circuit, wherein activation of the mechanical hardware switch by a user generates an electrical signal transmitted to the controller circuit indicative of physical proximity of the user to the controller circuit.

17. The apparatus of claim 16, wherein responsive to the electrical signal the controller circuit performs a secure erasure of at least a portion of the NVM by destroying an encryption key used to encrypt a plurality of user data sectors previously stored to the NVM, the current tag value changing responsive to the destruction of the encryption key.

18. The apparatus of claim 10, wherein the write protection of individual blocks can only be disabled by someone or something in close physical proximity to the apparatus.

19. A method comprising:
receiving a first write command from a host to write a first set of data, having an associated set of logical addresses, to a non-volatile memory (NVM);
processing the first set of write data by appending a first write protection tag value thereto to generate a first sector of data, and writing the first sector of data to an associated location in the NVM;
subsequently receiving a second write command from a host to write a second set of data, having at least a portion of the associated set of logical addresses, to the NVM;
retrieving a copy of at least a portion of the first sector of data from the associated location in the NVM to access the first write protection tag value thereof;
processing the second set of write data responsive to the first write protection tag value retrieved from the NVM by appending a second write protection tag value thereto to generate a second sector of data and writing the second sector of data to an associated location in the NVM responsive to the first write protection tag indicating the first sector of data is not write-protected, and by notifying the host that the second write command is rejected from further processing responsive to the first write protection tag indicating the first sector of data is write-protected.

20. The method of claim 19, further comprising performing a secure erasure of the NVM responsive to activation of a mechanical hardware switch mechanically coupled to a physical enclosure that encompasses the NVM or by enacting a change of a tag value stored in a keystore of a controller circuit coupled to the NVM.

\* \* \* \* \*